United States Patent
Gamble

(10) Patent No.: US 12,408,597 B1
(45) Date of Patent: Sep. 9, 2025

(54) PLANT PROTECTOR WITH SLIDINGLY ADJUSTABLE AND TELESCOPING HANDLE

(71) Applicant: Jeffrey Gamble, Chelsea, MI (US)

(72) Inventor: Jeffrey Gamble, Chelsea, MI (US)

(*) Notice: Subject to any disclaimer, the term of this patent is extended or adjusted under 35 U.S.C. 154(b) by 0 days.

(21) Appl. No.: 18/636,175

(22) Filed: Apr. 15, 2024

(51) Int. Cl.
 *A01G 13/27* (2025.01)
 *A01G 13/29* (2025.01)

(52) U.S. Cl.
 CPC .............. *A01G 13/27* (2025.01); *A01G 13/29* (2025.01)

(58) Field of Classification Search
 CPC ........................................................ A01G 13/27
 See application file for complete search history.

(56) References Cited

U.S. PATENT DOCUMENTS

| | | | |
|---|---|---|---|
| 1,955,950 A * | 4/1934 | Copeman | A01G 13/10 |
| | | | 118/DIG. 6 |
| 4,845,889 A | 7/1989 | Taylor | |
| 4,995,191 A * | 2/1991 | Davis | A01G 29/00 |
| | | | 47/32.7 |
| 5,048,229 A * | 9/1991 | Campbell | A01G 13/27 |
| | | | 47/32.4 |
| 5,385,005 A | 1/1995 | Ash | |
| 5,594,990 A * | 1/1997 | Brant | B25G 1/04 |
| | | | 172/14 |
| 11,457,572 B2 | 10/2022 | Battoe | |
| 11,464,175 B1 * | 10/2022 | Clarke | A01G 13/27 |
| 2009/0126298 A1 | 5/2009 | Salcedo | |
| 2016/0095284 A1 | 4/2016 | Britt | |
| 2016/0270305 A1 | 9/2016 | Shaffer et al. | |
| 2018/0235157 A1 | 8/2018 | Leslie | |
| 2019/0246867 A1 * | 8/2019 | Ziamandanis | B25G 1/04 |
| 2019/0261579 A1 | 8/2019 | Brown | |
| 2020/0337230 A1 * | 10/2020 | Bian | A01D 34/475 |
| 2021/0228390 A1 * | 7/2021 | Shepherd | A61F 4/00 |
| 2022/0061233 A1 | 3/2022 | Peace | |
| 2022/0251870 A1 | 8/2022 | DeWitt | |

* cited by examiner

*Primary Examiner* — Jessica B Wong
(74) *Attorney, Agent, or Firm* — Cramer Patent & Design, PLLC.; Aaron R. Cramer

(57) ABSTRACT

The plant protector may comprise a plant shield and a handle. The plant protector may be placed adjacent to a plant in preparation for using a lawn maintenance tool. As a non-limiting example, the lawn maintenance tool may be a string trimmer. The plant shield may protect the plant from being damaged by the operation of the lawn maintenance tool. The handle may be adapted to be grasped by a user while placing the plant protector. The length of the handle may telescopically adjust to be longer or shorter.

8 Claims, 6 Drawing Sheets

PLANT PROTECTOR WITH SLIDINGLY ADJUSTABLE AND TELESCOPING HANDLE

RELATED APPLICATIONS

None.

FIELD OF THE DEVICE

The presently disclosed subject matter is directed to the field of gardening tools and, more specifically, to devices designed to protect plants during the operation of lawn maintenance tools. The device pertains to a plant protector that offers a safeguard against damage from such tools, enabling users to maintain the area around plants without harming them. This device is particularly useful in the context of residential and commercial landscaping where the proximity of valuable or delicate plants to areas requiring maintenance poses a challenge.

BACKGROUND OF THE DEVICE

In the maintenance of lawns and gardens, it is often necessary to use tools such as string trimmers, edgers, and mowers. While these tools are effective for their intended purpose, they can also pose a risk to nearby plants, causing physical damage that can impair growth or even result in the death of the plant. Traditional methods of protecting plants, such as manually holding a barrier or avoiding the area altogether, are either ineffective or result in less than satisfactory maintenance of the lawn. There exists a need for a device that can protect plants from damage caused by lawn maintenance tools, which is easy to deploy and adjust by a single user, and which can adapt to various sizes and shapes of plants. The plant protector as described herein seeks to address these needs by providing a robust, adjustable, and easy-to-use device that shields plants from potential harm during lawn and garden maintenance activities.

SUMMARY OF THE DEVICE

Embodiments of the present disclosure may include a plant protector, including a plant shield configured to form a barrier between a plant and a lawn maintenance tool. In some embodiments, the plant shield may include a semi-cylindrical shell defining a concave inner surface facing the plant and a convex outer surface exposed to the lawn maintenance tool. Embodiments may also include a handle coupled to the plant shield. In some embodiments, the handle may be telescopic, enabling adjustment of the handle's length.

In some embodiments, the plant shield may be tapered, including a top portion with a smaller radius than a bottom portion of the plant shield. In some embodiments, the plant shield may include two or more horizontal slots parallel to each other. In some embodiments, the handle may be repositionable on the plant shield by sliding the handle along the horizontal slots.

In some embodiments, the handle may include a plurality of telescoping sections enabling the handle to collapse for storage and extend for use. In some embodiments, the plant protector may include a handle adapter. In some embodiments, the handle may be coupled to the plant shield via the handle adapter. In some embodiments, the handle adapter may be coupled to the plant shield using mounting fasteners.

In some embodiments, the mounting fasteners include at least one of screws, nuts, bolts, washers, rivets, hooks, collars, nipples, cams, standoffs, knobs, and brackets. In some embodiments, the handle may include a strap enabling the plant protector to be secured to a fixed object. In some embodiments, the plant shield may be made of molded plastic.

In some embodiments, the plant shield may be made of high-density polyethylene (HDPE). In some embodiments, the plant protector, configured for use in conjunction with additional plant protectors of the same configuration. In some embodiments, each plant protector may be placed adjacent to a different plant to allow operation of a lawn maintenance tool between the plants without damaging them.

In one specific embodiment, the plant protector consists of a plant shield designed to safeguard plants during lawn maintenance activities. The plant shield features a semi-cylindrical shell with a concave inner surface tailored to face the plant, and a convex outer surface to interact with the environment and deflect potential damage from lawn maintenance tools. Incorporated within the plant shield are horizontal slots, which facilitate the adjustable attachment of a handle, allowing for repositioning based on user preference or specific task requirements. The handle, essential for maneuvering the plant protector, includes telescoping sections to adjust the handle's length for ease of storage or to extend its reach during use. This adjustability enhances the ergonomic handling and versatility of the device. A handle adapter serves as the intermediary for securing the handle to the plant shield, employing mounting fasteners to ensure a robust and durable connection. Additionally, a strap attached to the handle provides the option to secure the plant protector to a stationary object, offering stability and hands-free convenience when necessary.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
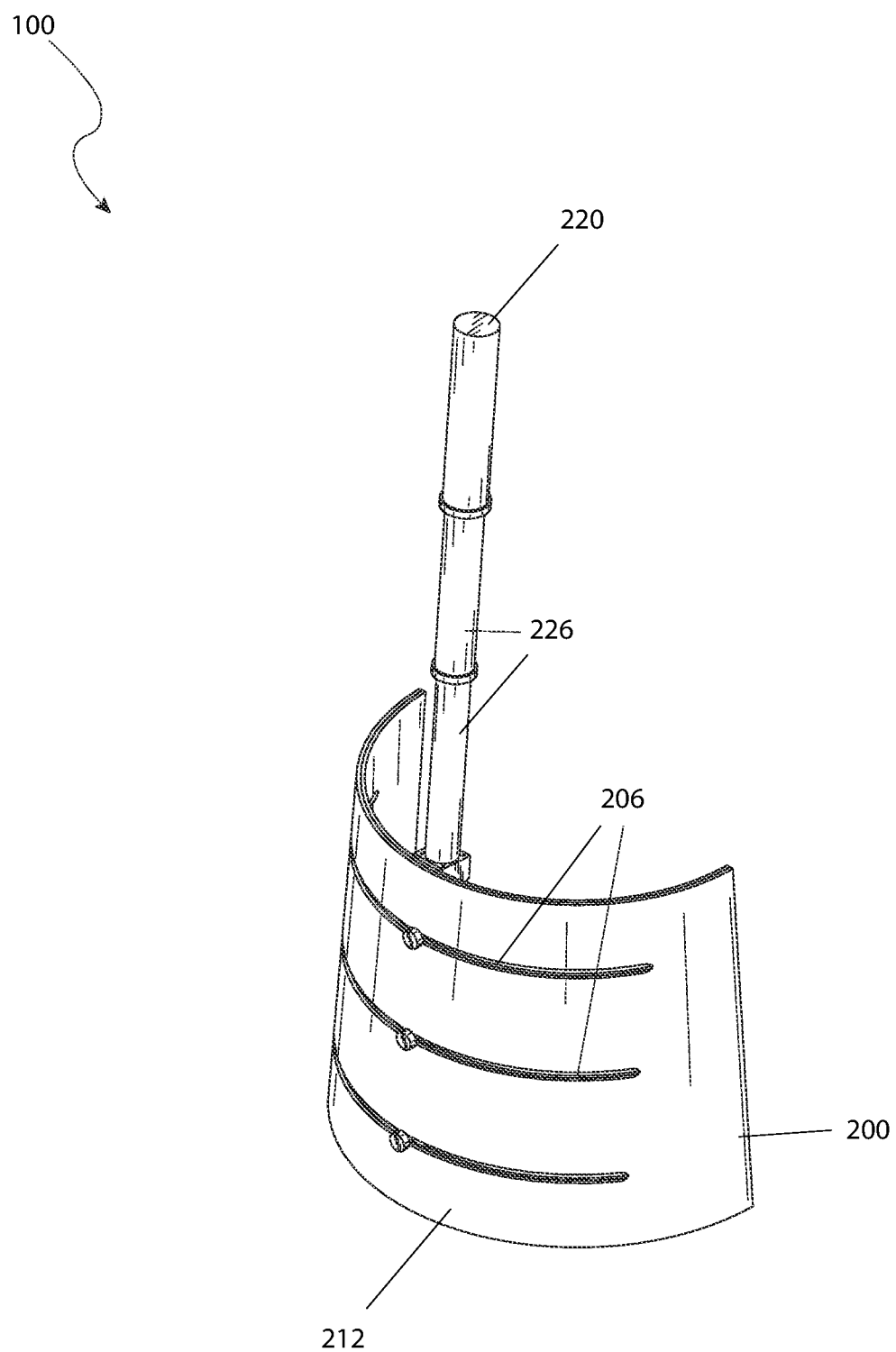
FIG. 1 is a front isometric view of a plant protector 100, according to an embodiment of the present device.
Figure 2:
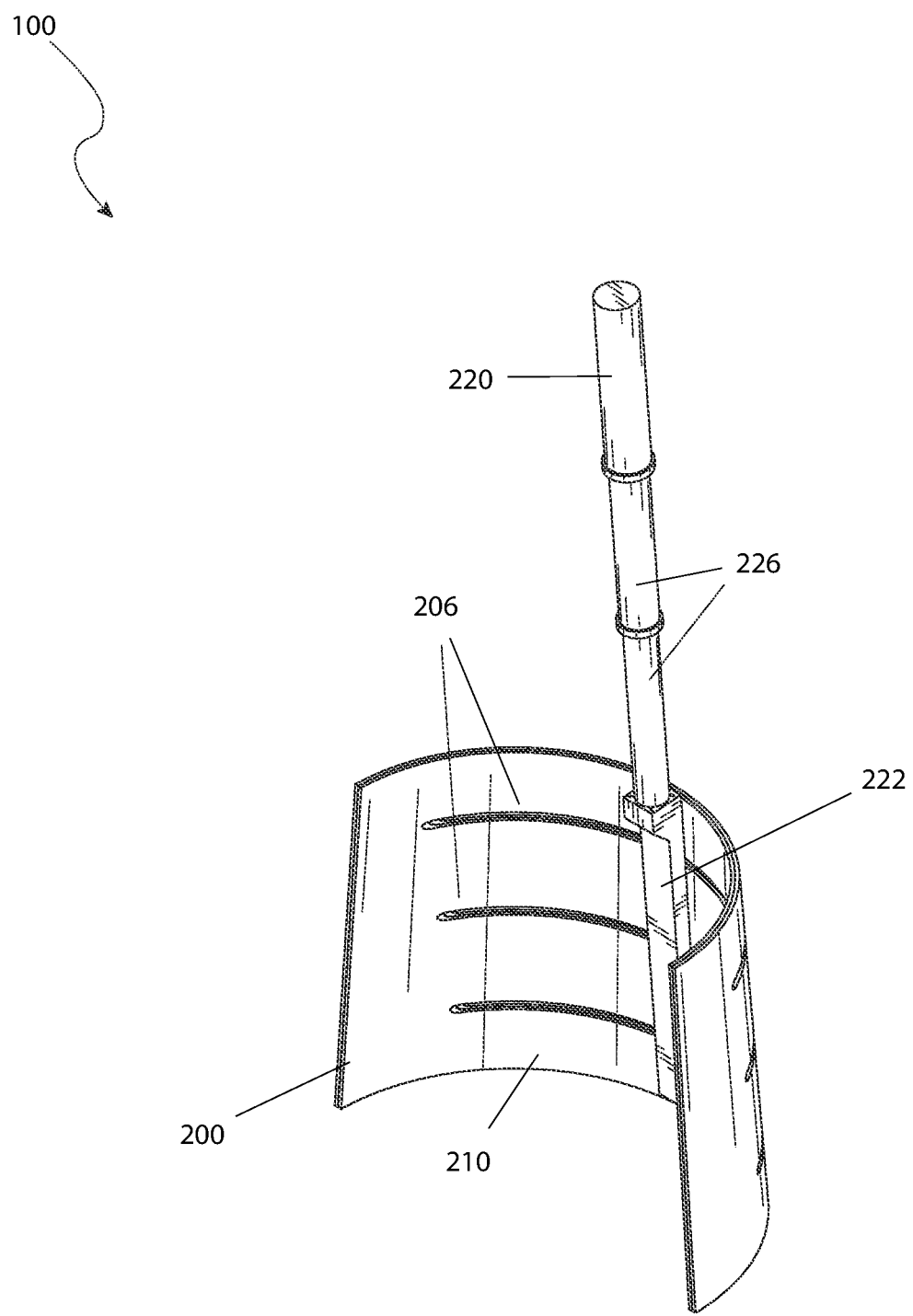
FIG. 2 is a rear isometric view of a plant protector 100, according to an embodiment of the present device.
Figure 3:
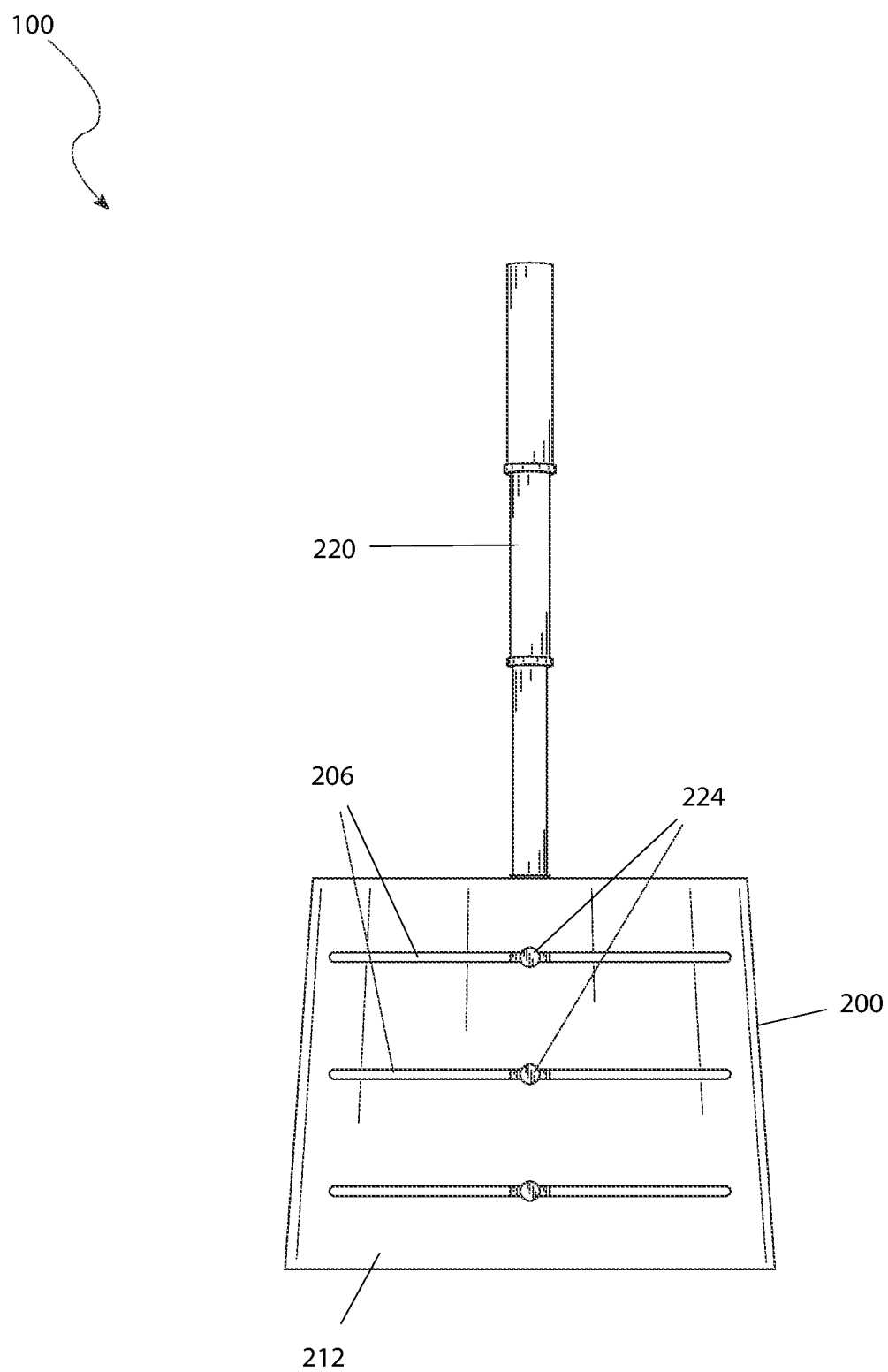
FIG. 3 is a front view of a plant protector 100, according to an embodiment of the present device.
Figure 4:
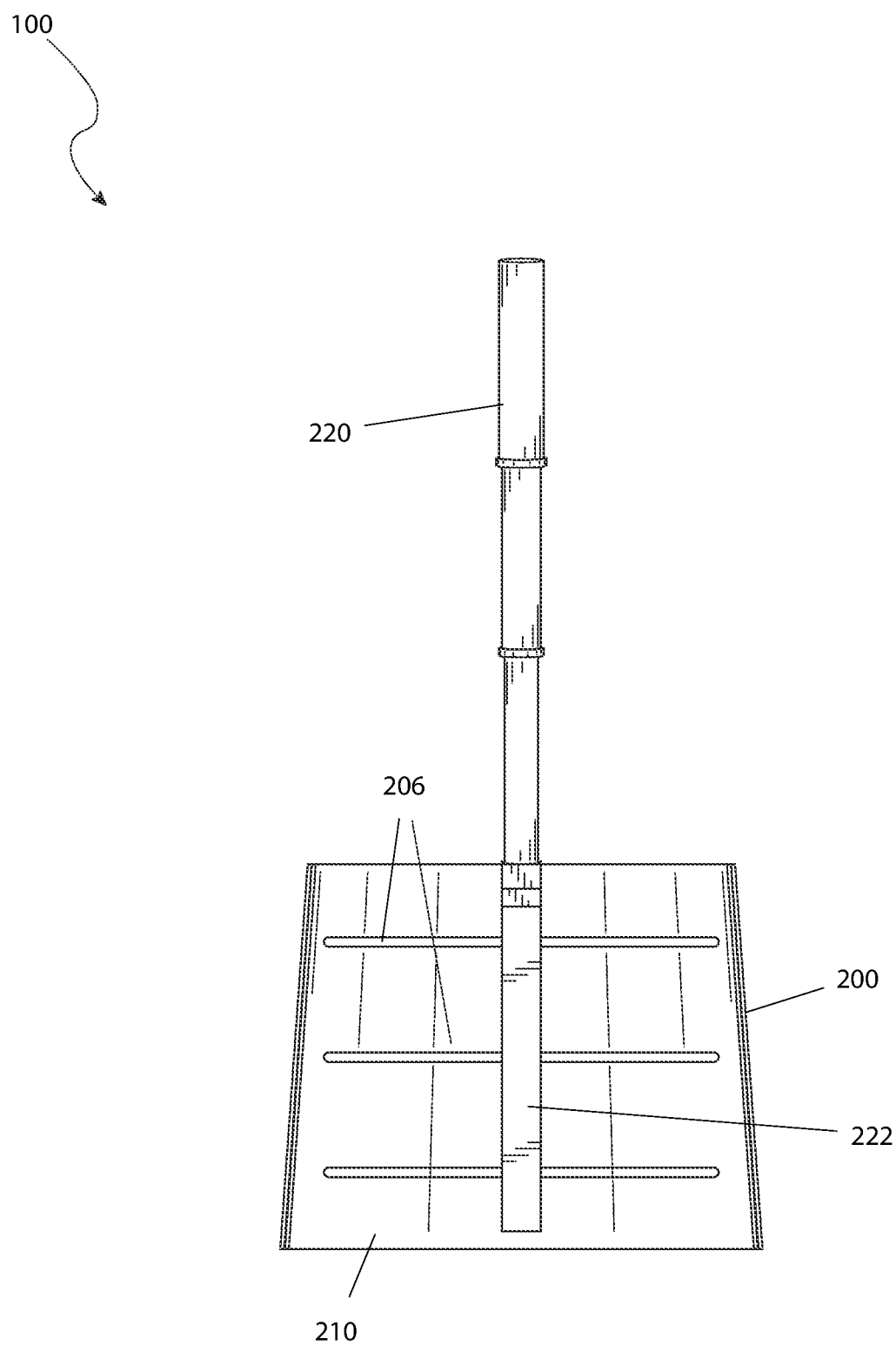
FIG. 4 is a rear view of a plant protector 100, according to an embodiment of the present device.
Figure 5:
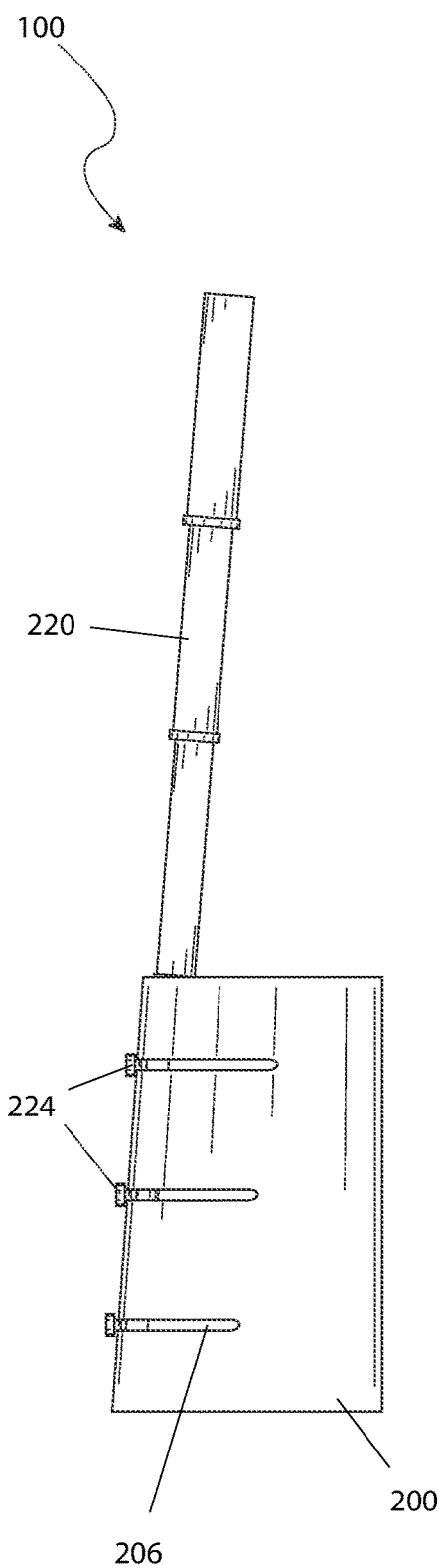
FIG. 5 is a left side view of a plant protector 100, according to an embodiment of the present device.
Figure 6:
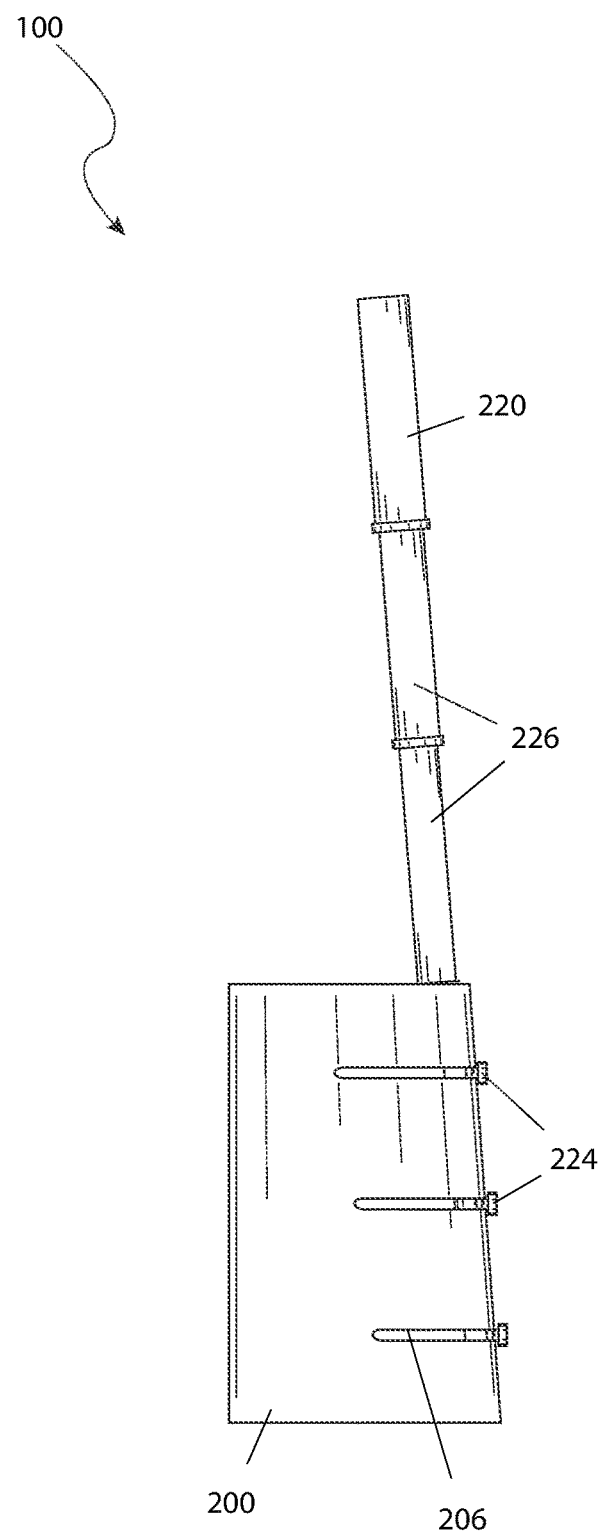
FIG. 6 is a right side view of a plant protector 100, according to an embodiment of the present device.
Figure 7:
FIG. 7 is a top view of a plant protector 100, according to an embodiment of the present device; and, FIG. 8 is a bottom view of a plant protector 100, according to an embodiment of the present device.
Figure 7:
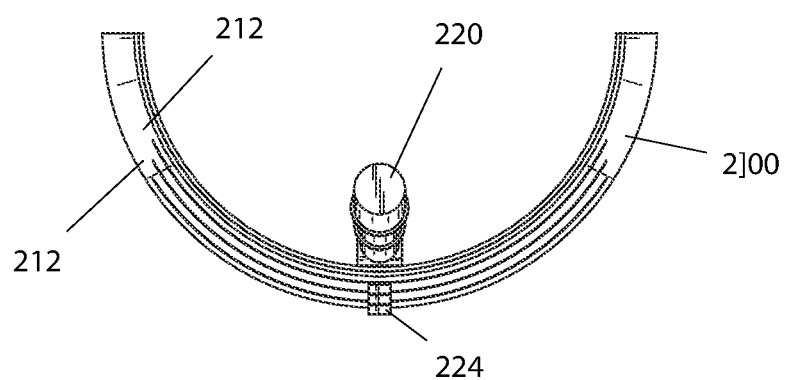
Figure 8:
Figure 8:
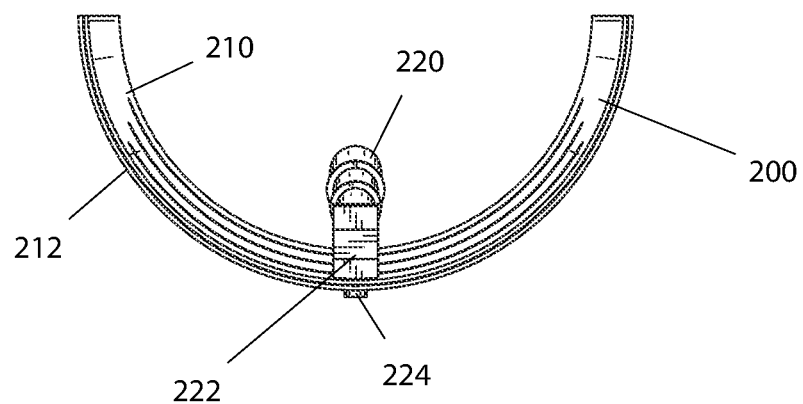

DESCRIPTIVE KEY 100 plant protector
200 plant shield
206 horizontal slot
210 concave inner surface
212 convex outer surface
220 handle
222 handle adapter 224 mounting fastener
226 telescoping section
240 strap

DESCRIPTION OF THE DEVICE

The present device is directed to a plant protector (herein described as the "device") 100. The device 100 may comprise a plant shield 200 and a handle 220. The device 100 may be placed adjacent to a plant in preparation for using a lawn maintenance tool. As a non-limiting example, the lawn maintenance tool may be a string trimmer. The plant shield 200 may protect the plant from being damaged by the operation of the lawn maintenance tool. The handle 220 may be adapted to be grasped by a user while placing the device 100. The length of the handle 220 may telescopically adjust to be longer or shorter.

The plant shield 200 may form a barrier between the plant and the lawn maintenance tool. The plant shield 200 may be the shape of semi-cylindrical shell defining a concave inner surface 210 and a convex outer surface 212. The concave inner surface 210 may face the plant. The convex outer surface 212 may be exposed to the lawn maintenance tool.

In some embodiments, the plant shield 200 may be tapered such that the top of the plant shield 200 may comprise a smaller radius than the bottom of the plant shield 200.

In some embodiments, the plant shield 200 may comprise two (2) or more horizontal slots 206. The horizontal slots 206 may be parallel to each other. The handle 220 may couple to the plant shield 200 via the horizontal slots 206. The handle 220 may be repositionable on the plant shield 200 by sliding the handle 220 along the horizontal slots 206.

The handle 220 may be coupled to the plant shield 200 and may extend upwards. The handle 220 may be adapted for the user to grasp while placing the plant shield 200.

The handle 220 may comprise a plurality of telescoping sections 226 such that the handle 220 may telescopically vary in length. As non-limiting examples, the handle 220 may telescopically collapse for storage and may telescopically extend for use.

In some embodiments, the handle 220 may couple to the plant shield 200 via a handle adapter 222. Specifically, the bottom of the handle 220 may couple to the top of the handle adapter 222 and the handle adapter 222 may couple to the plant shield 200 using mounting fasteners 224. As non-limiting examples, the mounting fasteners 224 may comprise screws, nuts, bolts, washers, rivets, hooks, collars, nipples, cams, standoffs, knobs, brackets, or any combination thereof.

In some embodiments, the handle 220 may comprise a strap 240 such that the device 100 may be secured to a tree, a fence, or other fixed object.

The plant shield 200 may be molded plastic. As a non-limiting example, the plant shield 200 may be made of high density polyethylene (HDPE).

Multiple shields 200 may be used at the same time to protect multiple plants that may be in close proximity to each other. As a non-limiting example, a first shield 200 may be placed adjacent to a first plant and a second shield 200 may be placed adjacent to a second plant so that the lawn maintenance tool may be operated between the first plant and the second plant without damaging either plant.

In use, the device 100 may be deployed by placing the plant shield 200 adjacent to a plant with the concave inner surface 210 facing towards the plant and the convex outer surface 212 facing away from the plant. The handle 220 may be extended and used to place the plant shield 200. A lawn maintenance tool such as a string trimmer may be operated near the plant without damaging the plant. The handle 220 may be collapsed while storing the device 100.

In one specific embodiment of the plant protector (100), the plant protector consists of a plant shield (200) designed to safeguard plants during lawn maintenance activities. The plant shield (200) features a semi-cylindrical shell with a concave inner surface (210) tailored to face the plant, and a convex outer surface (212) to interact with the environment and deflect potential damage from lawn maintenance tools. Incorporated within the plant shield (200) are horizontal slots (206), which facilitate the adjustable attachment of a handle (220), allowing for repositioning based on user preference or specific task requirements. The handle (220), essential for maneuvering the plant protector (100), includes telescoping sections (226) to adjust the handle's length for ease of storage or to extend its reach during use. This adjustability enhances the ergonomic handling and versatility of the device. A handle adapter (222) serves as the intermediary for securing the handle (220) to the plant shield (200), employing mounting fasteners (224) to ensure a robust and durable connection. Additionally, a strap (240) attached to the handle (220) provides the option to secure the plant protector (100) to a stationary object, offering stability and hands-free convenience when necessary.

The exact specifications, materials used, and method of use of the device 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A plant protector, comprising:
   a plant shield configured to form a barrier between a plant and a lawn maintenance tool, wherein the plant shield comprises a semi-cylindrical shell defining a concave inner surface facing the plant and a convex outer surface exposed to the lawn maintenance tool; and,
   a handle coupled to the plant shield, wherein the handle is telescopic, enabling adjustment of the handle's length; and,
   wherein the plant shield comprises two or more horizontal slots parallel to each other, and wherein the handle is repositionable on the plant shield by sliding the handle along the horizontal slots.

2. The plant protector of claim 1, wherein the plant shield is tapered, comprising a top portion with a smaller radius than a bottom portion of the plant shield.

3. The plant protector of claim 1, wherein the handle comprises a plurality of telescoping sections enabling the handle to collapse for storage and extend for use.

4. The plant protector of claim 1, further comprising a handle adapter, wherein the handle is coupled to the plant shield via the handle adapter, and wherein the handle adapter is coupled to the plant shield using mounting fasteners.

5. The plant protector of claim 4, wherein the mounting fasteners include at least one of screws, nuts, bolts, washers, rivets, hooks, collars, nipples, cams, standoffs, knobs, and brackets.

6. The plant protector of claim 1, wherein the plant shield is made of molded plastic.

7. The plant protector of claim 6, wherein the plant shield is made of high density polyethylene (HDPE).

8. The plant protector of claim 1, configured for use in conjunction with additional plant protectors of the same configuration, wherein each plant protector is placed adjacent to a different plant to allow operation of a lawn maintenance tool between the plants without damaging them.

\* \* \* \* \*